(12) United States Patent
Posseme et al.

(10) Patent No.: US 12,218,083 B2
(45) Date of Patent: Feb. 4, 2025

(54) METHOD OF MAKING AN INDIVIDUALIZATION ZONE OF AN INTEGRATED CIRCUIT

(71) Applicant: COMMISSARIAT A L'ENERGIE ATOMIQUE ET AUX ENERGIES ALTERNATIVES, Paris (FR)

(72) Inventors: Nicolas Posseme, Sassenage (FR); Stefan Landis, Tullins (FR); Hubert Teyssedre, Echirolles (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 868 days.

(21) Appl. No.: 17/443,131

(22) Filed: Jul. 21, 2021

(65) Prior Publication Data

US 2022/0028802 A1 Jan. 27, 2022

(30) Foreign Application Priority Data

Jul. 22, 2020 (FR) ...................................... 20 07720

(51) Int. Cl.
*H01L 23/00* (2006.01)
*H01L 21/033* (2006.01)
(Continued)

(52) U.S. Cl.
CPC ........ *H01L 23/573* (2013.01); *H01L 21/0337* (2013.01); *H01L 21/31144* (2013.01);
(Continued)

(58) Field of Classification Search
CPC ............... H01L 23/573; H01L 21/0337; H01L 21/31144; H01L 21/76816; H01L 23/5226;
(Continued)

(56) References Cited

U.S. PATENT DOCUMENTS 12,087,707 B2 * 9/2024 Posseme ........... H01L 21/76814
2014/0042628 A1 2/2014 Edelstein et al.
(Continued)

FOREIGN PATENT DOCUMENTS

EP 3 418 936 A1 12/2018

OTHER PUBLICATIONS

French Preliminary Search Report issued Apr. 15, 2021 in French Application 20 07720 filed on Jul. 22, 2020, 10 pages (with English Translation of Categories of Cited Documents & Written Opinion).

*Primary Examiner* — Caleen O Sullivan
(74) *Attorney, Agent, or Firm* — Oblon, McClelland, Maier & Neustadt, L.L.P.

(57) ABSTRACT

The invention relates to a method for making an individualization zone of a microchip comprising a first (10A) and a second (20A) level of electrical tracks (10, 20), and a conductor layer (30A) comprising via holes (30), the method comprising the following steps:
  providing at least one dielectric layer (200, 201, 202) having a thickness $h_d$,
  forming a metal mask layer (300) having a thickness $h_m$ and a residual stress $\sigma_r$ on the at least one dielectric layer (200, 201, 202),
  etching the layer (300) so as to form line patterns (310) of width l,
  etching the at least one dielectric layer (200, 201, 202) between the line patterns (310) so as to form trenches (210) separated by walls (211),
  filling the trenches (210) with an electrically conductive material so as to form the electrical tracks (10, 10$_{KO}$) of the first level (10A),
  forming via holes (30, 30$_{OK}$, 30$_{KO1}$, 30$_{KO2}$) of the conductor layer (30A),
  forming the second level (20A) of electrical tracks (20, 20$_{OK}$), (Continued)

the method being characterized in that the thicknesses $h_d$ and $h_m$, the residual stress $\sigma_r$, and the width l are chosen so that the line patterns (310) and the underlying walls (211) have random oscillations after etching of the at least one dielectric layer (200, 201, 202).

10 Claims, 7 Drawing Sheets

(51) Int. Cl.
  *H01L 21/311* (2006.01)
  *H01L 21/768* (2006.01)
  *H01L 23/522* (2006.01)
  *H01L 23/528* (2006.01)
(52) U.S. Cl.
  CPC .... *H01L 21/76816* (2013.01); *H01L 23/5226* (2013.01); *H01L 23/5283* (2013.01)

(58) Field of Classification Search
  CPC ............... H01L 23/5283; H01L 23/528; H04L 2209/12; H04L 9/3278; G06F 21/44; G06F 21/73
  USPC ......................................................... 257/618
  See application file for complete search history.

(56) References Cited

U.S. PATENT DOCUMENTS

| | | |
|---|---|---|
| 2014/0187035 A1* | 7/2014 | Posseme ............ H01L 21/31144 438/723 |
| 2015/0235964 A1 | 8/2015 | Feng et al. |
| 2016/0071742 A1 | 3/2016 | Feng et al. |
| 2018/0375670 A1 | 12/2018 | May et al. |
| 2023/0170251 A1* | 6/2023 | Landis ................... H04L 9/0866 438/618 |
| 2024/0096668 A1* | 3/2024 | Landis ............... H01L 21/76877 |
| 2024/0128119 A1* | 4/2024 | Landis ................... H04L 9/3278 |

* cited by examiner

METHOD OF MAKING AN INDIVIDUALIZATION ZONE OF AN INTEGRATED CIRCUIT

TECHNICAL FIELD

The present invention relates to the individualization of integrated circuits. The invention has a particularly advantageous application in the protection of integrated circuits, components, or devices integrating such circuits.

PRIOR ART

The individualization of an integrated circuit in a component provides unique identification for that component. For example, this makes it possible to protect the component against attacks that emulate the functions that the component is supposed to perform.

In order to uniquely identify an integrated circuit, there are solutions aimed at using the functional dispersions inherent in integrated circuits. The resistances of the metal interconnection lines or of the via holes differ from one circuit to the next, which induces voltage drops along the path followed by the electrical signal. The response time of signals therefore differs due to the induced variability of the propagation times of the signals at the limits of the circuit's electronic constraints, or due to the instability of the components at the time of booting, such as in the case of SRAMs (Static Random Access Memories), which have a unique state each time they are booted. Document EP3418936A1 describes a solution based on copolymer patterns in which the domains are randomly distributed.

However, these solutions are very sensitive to environmental variations or aging. In particular, changes in temperature, power supply voltage, or electromagnetic interference can affect the performances of these solutions by diminishing their robustness. Consequently, the response times of an integrated circuit may change over time. The result is that a valid circuit may possibly be declared counterfeit.

As a result, there is a need to limit or even solve the problems of the known solutions.

SUMMARY

In order to achieve this objective, one embodiment calls for a method for making an individualization zone on a microelectronic chip, said microchip comprising at least the following:
  a first and a second level of electrical tracks,
  a level of interconnections located between the first and the second levels of electrical tracks and comprising vias intended to electrically connect the electrical tracks of the first level to the electrical tracks of the second level.

The method comprises at least the following steps carried out in the individualization zone of the chip:
  providing a stack comprising at least one dielectric layer borne by a substrate, a metal mask layer over the at least one dielectric layer, said at least one dielectric layer having a thickness hd, and the metal mask layer having a thickness $h_m$ and a residual stress σr,
  etching the metal mask layer so as to form line patterns of width l organized according to a predefined arrangement plan, said line patterns being intended to be transferred in the form of walls to the at least one dielectric layer,
  etching the at least one dielectric layer between the line patterns of the metal mask layer so as to form trenches separated by walls based on the at least one dielectric layer,
  filling the trenches with an electrically conductive material so as to form the electrical tracks of the first level,
  forming vias of the level of interconnections according to the predefined arrangement plan,
  forming the second level of electrical tracks, for example according to the predefined arrangement plan.

Advantageously, the thicknesses $h_d$ and $h_m$, the residual stress $\sigma_r$, and the width l are chosen so that the line patterns and the underlying walls have random oscillations after etching of the at least one dielectric layer, the filling of the trenches being performed so that the electrical tracks of the first level are a function of these random oscillations, the random oscillations being such that at least some of the vias are not connected to the electrical tracks of the first level.

The oscillations are typically generated by relaxing the mechanical stresses at the time of trench etching. The appearance of free surfaces at the walls and line patterns requires a new equilibrium situation and a new stress state (the normal stresses at the free surfaces are zero). In particular, relaxation of the mechanical stresses in the line patterns can be plastic and non-homogeneous, depending on the level of residual stress $\sigma_r$ and the thickness $h_m$. The result is a deformation of the line patterns based on the metal mask layer and, as a result, the walls based on the at least one dielectric layer. The deformation will also depend on the width l of the line patterns and of the underlying walls, and the thickness $h_d$ of the at least one dielectric layer (typically the height of the walls). The relaxation process depending on all of these parameters generates chaotic and random oscillations.

Thus, the random oscillations of the line patterns, imposed or transferred to the walls based on the at least one dielectric layer locally modify the width of the etched trenches. Each trench bordered by two randomly oscillating walls thus has a randomly varying width and/or position.

After filling, the electrical tracks of the first level also have these same random width and/or position variations. The electrical tracks of the first level thus have a morphology that depends of the random oscillations.

As such, the formation of the vias according to the predefined arrangement plan means that a portion of the vias is not connected or is poorly connected to the electrical tracks of the first level. The vias, also named via holes in the following, then comprise functional vias electrically connected to the electrical tracks of the first level, dysfunctional vias partially electrically connected to the electrical tracks of the first level, and inactive vias not electrically connected to the electrical tracks of the first level.

The distribution of these functional, dysfunctional, and inactive via holes depends on the random oscillations induced by the method.

The proposed method therefore makes it possible to deliberately, but randomly, deform the first layer of electrical tracks. This deliberate deformation makes it possible to create inactive via holes randomly distributed within the individualization zone of the chip. The response curve of the chip or integrated circuit will therefore be closely tied to the random distribution of the inactive via holes. The response will therefore be unique. Each integrated circuit made using this method thus generates a different response. Furthermore, the response curve of the integrated circuit will be stable over time, contrary to the solutions described above in the prior art section.

It is difficult or even impossible to physically clone the individualization zone. It may be referred to using the acronym PUF (Physically Unclonable Function). It is therefore possible to make an integrated circuit including this individualization zone unique.

The method according to the invention thus proposes a reliable solution that can easily be implemented at a limited cost in order to make an individualization zone on an integrated circuit.

The first level of electrical tracks can be made before or after the second level of electrical tracks.

According to one possibility, the electrical tracks of the second level are deformed according to the principle of the method, alternatively or in combination with the electrical tracks of the first level. Thus, the method comprises at least the following steps carried out in the individualization zone of the chip:

forming the first level of electrical tracks, forming the via holes of the level of interconnections according to a predefined arrangement plan, forming the second level of electrical tracks so as to connect the via holes of the level of interconnections, the formation of at least a given level of electrical tracks taken from the first level of electrical tracks and the second level of electrical tracks comprises:

providing a stack comprising at least one dielectric layer borne by a substrate with a metal mask layer above it, the at least one dielectric layer having a thickness $h_d$ and the metal mask layer having a thickness $h_m$ and a residual stress $\sigma_r$, etching the metal mask layer so as to form line patterns of width l organized according to the predefined arrangement plan, said line patterns being intended to be transferred to the at least one dielectric layer, etching the at least one dielectric layer between the line patterns so as to form trenches separated by walls based on the at least one dielectric layer, filling the trenches with an electrically conductive material so as to form the electrical tracks of said given level taken from the first level of electrical tracks and the second level of electrical tracks.

The thicknesses $h_d$ and $h_m$, the residual stress $\sigma_r$, and the width l are chosen so that the line patterns and the underlying walls have random oscillations after etching of the at least one dielectric layer, the filling of the trenches being performed so that the electrical tracks of said first given level are a function of these random oscillations, the random oscillations being such that at least some of the via holes are not connected to the electrical tracks of said given level.

Another aspect concerns a method for making a microelectronic device including at least one integrated circuit, the integrated circuit comprising at least:

a first and a second level of electrical tracks, a level of interconnections located between the first and the second levels of electrical tracks and comprising via holes intended to electrically connect tracks of the first level to tracks of the second level an individualization zone of the integrated circuit.

The individualization zone is made by implementing the method described earlier, preferably on only a portion of the integrated circuit.

Another aspect concerns a microelectronic device and a method for making a microelectronic device.

The microelectronic device includes at least one integrated circuit including at least one individualization zone and a functional zone, said zones comprising a first and a second level of electrical tracks, a level of interconnections located between the first and the second levels of electrical tracks and comprising via holes intended to electrically connect tracks of the first level to tracks of the second level.

Advantageously, the electrical tracks of the first level of the individualization zone are separated by walls based on at least one dielectric layer, the walls having random oscillations such that at least some of the via holes are not connected to the electrical tracks of the first level. The walls pass through the individualization zone, preferably from a first side of the individualization zone to a second side of the individualization zone opposite the first side. The random oscillations are therefore configured to deliberately degrade the electrical connection between the tracks of the first level of the individualization zone and some of the via holes of the level of interconnections. Thus, some of via holes of the level of interconnections do not connect or poorly connect the electrical tracks of the first level of the individualization zone. The random nature of the oscillations makes the response curve of the integrated circuit unique. Furthermore, the response curve is stable over time, contrary to the solutions of the prior art. The microelectronic device thus has an improved individualization zone.

The method for making such a device typically comprises the Implementation of the method for making an individualization zone described elsewhere on only a portion of the integrated circuit.

A microelectronic device is understood to be any type of device made using microelectronic means. In addition to devices for purely electronic purposes, these devices include micro- and nano-electromechanical systems (MEMS, NEMS, etc.) as well as micro-opto-electro-mechanical systems (MOEMS, etc.). It may be a device intended to perform an electronic, optical, mechanical, or other function. It may also be an intermediate product intended solely for the purpose of making another microelectronic device.

BRIEF DESCRIPTION OF THE FIGURES

The purpose and subject matter as well as the features and advantages of the invention will be better understood from the detailed description of an embodiment of the invention shown in the following accompanying drawings, in which.

Figure 1:
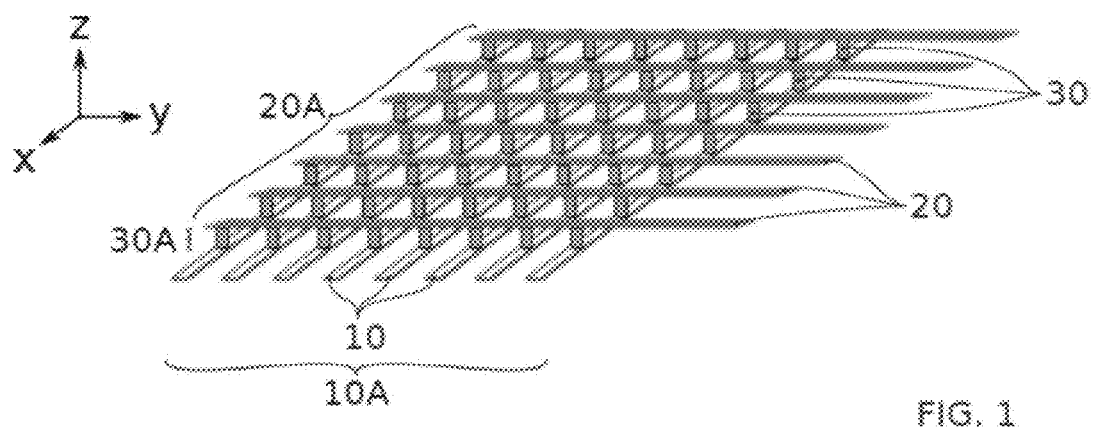
FIG. 1 shows a perspective drawing of a first level of electrical tracks and a second level of electrical tracks interconnected by functional via holes of a level of interconnections, according to the prior art.

The drawings are provided as examples and do not limit the invention. They are schematic representations intended to facilitate understanding of the invention and are not necessarily drawn to the scale of practical applications. In particular, the thicknesses and dimensions of the various layers, via holes, and patterns in the schematics are not representative of reality.

DETAILED DESCRIPTION

Before entering into a detailed review of embodiments of the invention, optional features which may possibly be used in combination or as alternatives are given below:

According to one example, the residual stress is compressive ($\sigma_r<0$). This promotes the occurrence of oscillations after trench etching.

According to one example, the thickness $h_m$ of the metal mask layer is greater than nm. This increases the amplitude of the oscillations.

According to one example, the walls have an aspect ratio of $h_d/l \geq 2$. This increases the amplitude of the oscillations.

According to one example, the walls are substantially the same length. According to one example, the walls are continuous along the entire length thereof. According to one example, the walls have a length substantially corresponding to a dimension of the individualization zone. According to one example, the walls pass through the individualization zone.

According to one example, the ratio of the thicknesses of the at least one dielectric layer and of the metal mask layer is such that $2 \geq h_d/h_m \geq 1$. This increases the amplitude of the oscillations.

According to one example, the thickness $h_d$ of the at least one dielectric layer is greater than 100 nm.

According to one example, the metal mask is made of or based on one of the following materials: Ti, TiN, TaN. It may also be made of any metal, the residual stress of which can be controlled during deposition, similarly to TiN.

According to one example, the at least one dielectric layer comprises a layer based on dense SiOCH or porous SiOCH (p-SiOCH), or based on $SiO_2$.

According to one example, the line patterns are straight before etching of the at least one dielectric layer.

According to an alternative example covered by the present invention, the line patterns are curvilinear before etching of the at least one dielectric layer. The random oscillations created after etching are superimposed on the initial straight or curvilinear line pattern, that is, before etching.

According to one example, the second level of electrical tracks is formed in such a way that the electrical tracks of the second level also have random oscillations. Typically, the second level of electrical tracks is formed in a similar way to the formation of the first level of electrical tracks. This increases the probability of defective connections between the electrical tracks of the first and second levels.

According to one example, the chip has at least one other zone, separate from the individualization zone, intended to form a functional zone of the chip.

According to one example, the method further comprises the following steps:
- forming a protective mask in the individualization zone on the metal mask layer prior to formation of the line patterns,
- etching the metal mask layer in the functional zone, outside the individualization zone, so that the metal mask layer in the functional zone has a thickness $h_r<h_m$,
- removing the protective mask before forming the line patterns in the individualization zone.

According to one example, the line patterns are formed successively in the functional zone and in the individualization zone.

According to one example, the electrical tracks of the first level of the functional zone are straight.

The electrical tracks with random oscillations are only made in the at least one individualization zone. The integrated circuit has at least one other zone, separate from the individualization zone, that is preferably intended to form a functional zone for the integrated circuit. This other zone typically has a larger surface area than the surface area of the individualization zone. The first and the second levels of electrical tracks, as well as the level of interconnections, extend into said at least one other zone. As is conventional, the functional zone of the integrated circuit comprises logical inputs and outputs. This functional zone is intended to perform logical functions for the expected operation of the integrated circuit. Apart from the electrical tracks, this functional zone may comprise microelectronic structures such as, for example, transistors, diodes, MEMS, and so on.

As for the individualization zone, its function is to make each integrated circuit unique.

As part of the present invention, a so-called PUF individualization zone is perfectly differentiated from a functional zone intended, for example, to perform logical operations. As for the individualization zone, it primarily and preferably has the sole function of allowing for unique identification of the chip and therefore its authentication of the chip. The individualization zone is accessible separately from the functional zone. The individualization zone is located in a well-delimited zone of the chip. For example, the individualization zone has a polygonal shape, such as that of a rectangle. In this way, not any defective zone can be assimilated to a PUF individualization zone. Likewise, not any non-defective zone can be assimilated to a functional zone.

The functional zone typically has a surface area that is at least twice as large as that of the individualization zone. The individualization zone extends over at least 5% and preferably over at least 10% of the surface of the integrated circuit.

In the present application, the terms "chip" and "integrated circuit" are used as synonyms.

In the present application, the terms "oscillations" and "undulations" are used as synonyms. These terms refer to a sine wave shape consisting of alternating concave and convex curves. The oscillations are not necessarily periodic. They are superimposed over the line pattern initially conceived by the arrangement plan of the circuit or layout, which is the term commonly used to refer to such an arrangement plan. The expressions "arrangement plan" and "layout" are equivalent and can be used interchangeably.

The residual stress in the metal mask layer can depend on the material of the metal mask, the technique used to deposit the layer, and the deposited thickness. A person skilled in the art generally knows what residual stress will remain in such a layer, such as by means of nomograms. Various characterization techniques (for example, measuring the radius of curvature of a plate on which the layer is fully deposited) commonly used in the microelectronics industry also make it possible to measure this residual stress.

Note that, in the context of this invention, the term via hole encompasses all electrical connections such as pads, lines, and conductive structures which run, preferably perpendicularly, between two layers of the integrated circuit, whether adjacent or not, that is, between two levels of electrical tracks. Each level of electrical tracks lies primarily in a plane and can include functional micromechanical or microelectronic structures such as transistors, for example. Preferably, each via hole forms a pad with a substantially circular cross-section.

In the context of this invention, a via hole has a critical dimension $CD_{via}$, such as a diameter, taken according to a cross-section parallel to the various levels of the integrated electrical tracks. Preferably, $CD_{via}$ is less than 100 nm. Preferably, $CD_{via}$ is between 10 nm and 70 nm.

Note that, in the context of this invention, the terms "on," "sits over," "covers," "underlying," "opposite," and equivalents thereof do not necessarily mean "in contact with." For example, the deposition, addition, bonding, assembly, or application of a first layer on a second layer does not necessarily mean that the two layers are directly in contact with one another, but does mean that the first layer covers the second layer at least in part by being either directly in contact therewith or by being separated therefrom by at least one other layer or at least one other element.

Furthermore, a layer may be composed of a plurality of sub-layers of a same material or of different materials.

A substrate, film, layer, or structure "based" on a material A is understood to be a substrate, film, layer, or structure solely comprising said material A, or comprising this material A and possibly other materials, for example doping agents.

Several embodiments of the invention implementing successive steps of the manufacturing method are described below. Unless explicitly stated otherwise, the adjective "successive" does not necessarily mean that the steps immediately follow each other, even if that is generally the preferred meaning, and so there may be intermediate steps between them.

In addition, the term "step" refers to a portion of the method and may designate a set of sub-steps.

Furthermore, the term "step" does not necessarily means that the actions taken during a step are simultaneous or immediately follow each other. In particular, certain actions of a first step may be followed by actions associated with a different step, and other actions of the first step may be resumed later. Thus, the term step is not necessarily understood as unitary and inseparable actions over time and in the sequence of phases in the method.

Thus, according to one possibility, the formation of the first and second levels can be reversed and the second level can be formed before the first level. The designation of "first" level and "second" level is arbitrary. The method also covers the case in which the formation of the "second" level is configured so that the electrical tracks of the "second" level are a function of the random oscillations generated by the implementation of the method.

The word "dielectric" refers to a material with an electrical conductivity that is low enough in the given application to be used as an insulator. In the present invention, a dielectric material preferably has a dielectric constant of less than 7.

"Selective etching with respect to" or "etching having a selectivity with respect to" is understood as an etching configured to remove a material A or a layer A with respect to a material B or a layer B, and having an etch rate of material A that is greater than the etch rate of material B. The selectivity is the ratio between the etch rate of material A to the etch rate of material B.

In the context of this invention, an organic material or organo-mineral material which can be shaped by exposure to a beam of electrons, photons, or X-rays, or mechanically, is considered a resin.

As an example, let us mention resins typically used in microelectronics, resins based on polystyrene (PS), methacrylate (for example Polymethyl MethAcrylate, PMMA), Hydrogen Silsesquioxane (HSQ), polyhydroxystyrene (PHS), and so on. The interest of using a resin is that it is easy to deposit a large thickness of it measuring several hundred nanometers to several microns.

Anti-reflective layers and/or coatings can be associated with the resins. In particular, this helps to improve the lithographic resolution. In the remainder of this document, the various resin-based masks are preferably associated with such anti-reflective layers.

According to one example, the metal mask can be considered a hard mask. The metal mask layer can be considered a hard metal mask layer.

The mask is considered "hard" for the sake of differentiating it from resin-based masks. It withstands the etching customarily used for etching resin masks.

An orthonormal coordinate system comprising the x, y, and z axes is shown in the appended figures. When a single coordinate system is shown on the same plate of figures, the coordinate system applies to all the figures on the plate.

In the present patent application, the word thickness will preferably be used for a layer and the word depth for an etching. The thickness is measured in a direction perpendicular to the primary extension plane of the layer, and the depth is measured perpendicularly to the basal plane xy of the substrate. Thus, a layer lying parallel to the basal plane typically has a thickness in the z direction, and an etching also has a depth in the z direction. The relative terms "on," "sits over," "below," and "underlying" refer to positions considered in the z direction.

An element located "above" or "at" another element means that the two elements are both on a same line perpendicular to a plane in which a lower or upper surface of a substrate extends, that is, on a same line oriented vertically in the figures.

FIG. 1 shows a schematic of a portion of an integrated circuit comprising a first level 10A of electrical tracks 10, and a second level 20A of electrical tracks 20. Each of these levels 10A and 20A lies primarily along a plane. These planes are substantially parallel to each other and to a substrate, not shown, on which this first level 10A and this second level 20A of electrical tracks 10 and 20 rest. The integrated circuit also comprises a level of interconnections 30A or conductor layer 30A configured to electrically connect tracks of the first level 10A to tracks of the second level 20A, possibly redundantly. This conductor layer 30A comprises conductive portions generally considered to be via holes 30. Note that via holes 30 can connect tracks of two levels that are not adjacent but which are themselves separated by one or more other levels.

FIGS. 2A to 2E schematically show the conventional steps for forming a level of electrical tracks, typically a first level 10A.

Figure 2A:
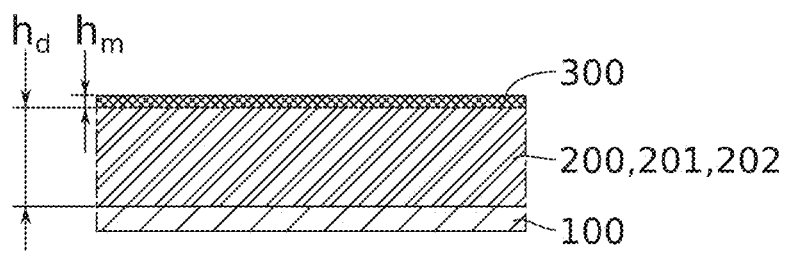
FIGS. 2A to 2E show steps for forming a level of electrical tracks according to a "damascene" method of the prior art.

A stack in the z direction of dielectric layers 200, 201, and 202 is first formed on a substrate 100 (FIG. 2A). This stack of dielectric layers 200, 201, and 202 has a thickness $h_d$ and may comprise the following layers starting with substrate 100:

Optionally, an etch stop layer 201, for example based on SiCN. This SiCN layer 201 is typically applied by plasma-enhanced chemical vapor deposition (PECVD). It may have a thickness that is on the order of 20 nm.

A dielectric layer 200, such as a layer of silicon oxide doped with carbon, SiOCH. This SiOCH layer can be dense or porous (p-SiOCH), with, for example, a porosity on the order of 25%. It typically has a low dielectric constant such as on the order of 2.5. It can thus be considered a ULK (Ultra-Low k) layer. This SiOCH layer 200 can be deposited by PECVD. It may have a thickness that is typically between 50 nm and 300 nm.

Optionally, a silicon oxide layer 202. This layer 202 can be deposited by PECVD. It may have a thickness that is between 20 nm and 100 nm.

A hard metal mask layer 300, also referred to as a hard metal mask 300 or simply mask 300, is then formed on the stack of dielectric layers 200, 201, and 202 (FIG. 2A). This mask 300 can be based on titanium, Ti, or titanium nitride, TiN, or tantalum nitride, TaN. According to one embodiment, the metal mask 300 is made of titanium nitride. It can be formed by physical vapor deposition (PVD). The mask 300 typically has a thickness $h_m$ and a residual stress $\sigma_r$. The residual stress $\sigma_r$ generally depends on the deposition technique and/or parameters. It may be tensile ($\sigma_r>0$) or compressive ($\sigma_r<0$). Conventionally, the aim is to minimize this residual stress $\sigma_r$.

Figure 2B:
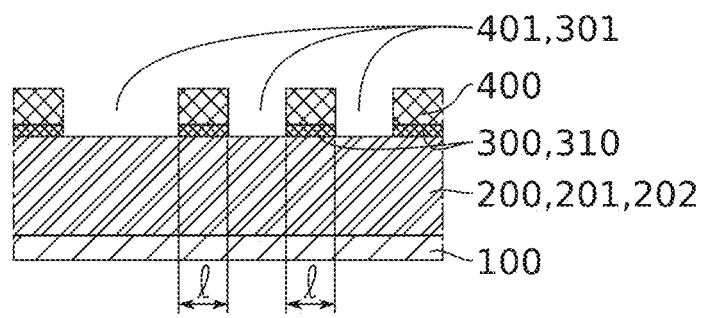

The metal mask 300 is structured by means of a mask 400 having openings 401 (FIG. 2B). These openings 401 of the mask 400 serve, in particular, to open the metal mask 300. Depending on the technique implemented to open the mask 300, the mask 400 can be made of one or more layers. It can be based on a resin, for example photosensitive resin, for example with a positive tone. A bottom anti-reflective coating (BARC) is preferably placed between the metal mask 300 and the mask 400. The mask 400 made of photosensitive resin can have a thickness of between 100 nm and 500 nm. The anti-reflective coating can have a thickness of between 20 nm and 80 nm.

Alternatively, the mask 400 may comprise two SOC (Spin On Carbon) and SiARC (Silicon Anti-Reflective Coating) layers, as well as a layer of photosensitive resin. The thicknesses of these three layers vary according to the type of products used and the dimensions of the via holes in question. They are typically on the order of 150 nm for SOC, 30 nm for SiARC, and about 100 nm for resin.

Preferably, the mask layer or layers 400, and possibly the anti-reflective coating, are deposited using a conventional spin coating method.

The openings 401 of the mask 400 are made by implementing conventional lithography techniques such as optical lithography, electron beam (ebeam) lithograph, nanoimprint lithography, or any other lithography technique known to a person skilled in the art.

The anti-reflective coating and the metal mask 300 can be etched by plasma using chlorine-based etching chemistry, such as Cl2/BCl3. This type of plasma makes it possible to use a mask 400 based on resin with a thin thickness, for example less than 200 nm.

Upon completion of this etching, the mask 300 comprises line patterns 310, separated by mask openings 301 (FIG. 2B). The line patterns 310 typically have a width l. They are intended to be transferred to the underlying stack of dielectric layers 200, 201, and 202.

Figure 2C:
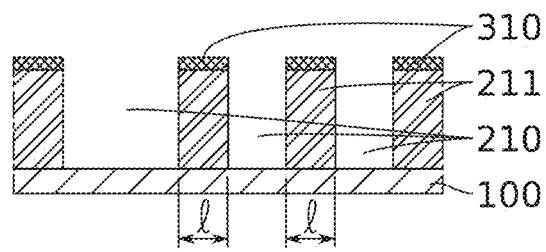

After opening of the mask 300 and removal of the mask 400, typically by oxygen plasma, the stack of dielectric layers 200, 201, and 202 is etched so as to form trenches 210 (FIG. 2C). The dielectric layers 200 and 202 are preferably etched by plasma, for example by fluorine plasma. To do this, fluorocarbon chemistry, $C_4Fa/N_2/Ar/O_2$, can be used The etch stop layer 201 based on SiCN is typically opened by plasma based on $CH_3F/CF_4/N_2/Ar$ chemistry so as to expose the substrate 100.

The trenches 210 are separated by walls 211 based on the layers 200, 201, and 202. These walls 211 typically have a height $h_d$ and a width l (FIG. 2C). The line patterns 310 are above them.

In a preferred but optional way, a barrier layer 40 is then deposited in a compliant way at the bottom of the trenches 210, on the walls 211 and the line patterns 310. The purpose of this barrier layer 40 is to avoid diffusion of the track metal in the dielectric layer 200.

Figure 2D:
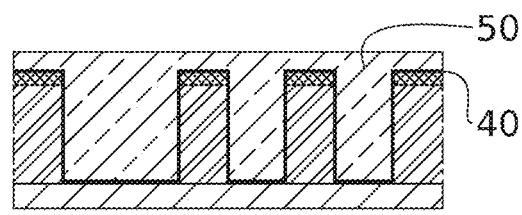

The trenches 210 are then filled with an electrically conductive material 50—typically copper (FIG. 2D).

Figure 2E:
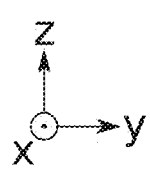
Figure 2E:
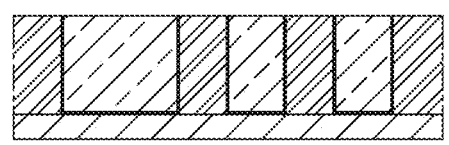

A planarization step, for example by chemical-mechanical polishing, CMP, is performed after filling of the trenches 210 so as to remove the excess conductive material. This CMP also removes the line patterns 310. The electrical tracks 10 of the first level 10A are thus formed (FIG. 2E).

Figure 3A:
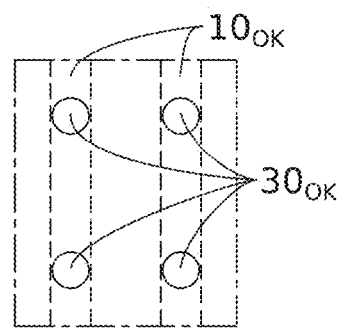
FIG. 3A shows a top view of a functional zone comprising electrical tracks of the first level associated with functional via holes, according to an embodiment example of the present invention.

By implementing this method typically known by the name "damascene," a person skilled in the art can make straight electrical tracks 10 on a first level 10A, as shown as a top view in FIG. 3A.

These tracks 10 and $10_{OK}$ can then be connected to via holes 30 and $30_{OK}$ of the conductor layer 30A. The formation of these via holes 30 is already known. The tracks $10_{OK}$ and the via holes $30_{OK}$ are thus formed according to the layout of the integrated circuit. The via holes $30_{OK}$ are functional via holes electrically connected to the electrical tracks $10_{OK}$ of the first level 10A.

Figure 3B:
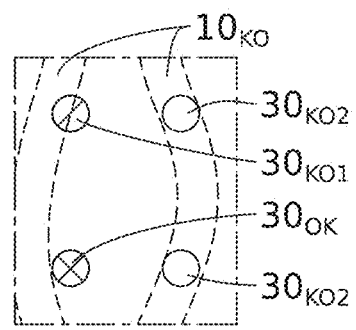
FIG. 3B shows a top view of an individualization zone comprising electrical tracks of the first level having random oscillations, associated with functional via holes and dysfunctional or inactive via holes, according to an embodiment example of the present invention.

In order to make an individualization zone of the integrated circuit, the manufacturing method described above is modified so as to form tracks $10_{KO}$ having oscillations or undulations and/or variations in width, as shown as a top view in FIG. 3B.

The via holes formed according to the layout of the integrated circuit are no longer perfectly superimposed over the oscillating electrical tracks $10_{KO}$. The via holes 30 then comprise functional via holes $30_{OK}$ and dysfunctional or inactive via holes $30_{KO1}$ and $30_{KO2}$. The dysfunctional via holes $30_{KO1}$ typically are partially connected to the electrical tracks $10_{KO}$ of the first level. In particular, the electrical resistance thereof is much higher than the functional via holes $30_{OK}$. The inactive via holes $30_{KO2}$ are typically connected to the electrical tracks $10_{KO}$ of the first level.

According to one possibility, the dysfunctional via holes $30_{KO1}$ are identified, for example, by measuring the resistance thereof. It is then preferable to deactivate them. This freezes their electrical behavior. This improves the stability of the integrated circuit's response curve overtime.

Figure 4:
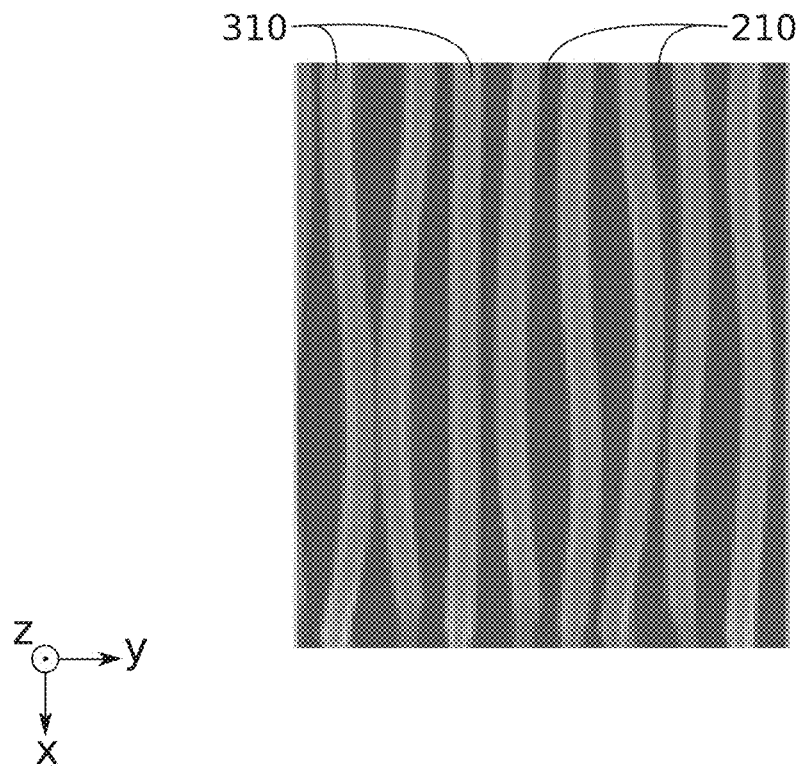
FIG. 4 is a top view of a scanning electron microscope image of slices having random oscillations after etching, according to an embodiment of the present invention.

FIG. 4 is a top-view electron microscope image showing oscillations obtained in the line patterns 310 when etching the trenches 210.

In order to obtain such oscillations, the method described above in reference to FIGS. 2A to 2E is adapted by choosing the values of the parameters of the residual stress $\sigma_r$, width l, and thicknesses $h_d$ and $h_m$. The values of the parameters preferably lie within the following ranges:

The residual stress v, is negative (tensile) and preferably less than 1000 MPa.

The width l of the line patterns 310 is less than 90 nm and preferably less than 70 nm.

The thickness $h_m$ of metal mask 300 is preferably greater than 15 nm.

The thickness $h_d$ of the at least one dielectric layer is preferably greater than 100 nm.

Figure 5:
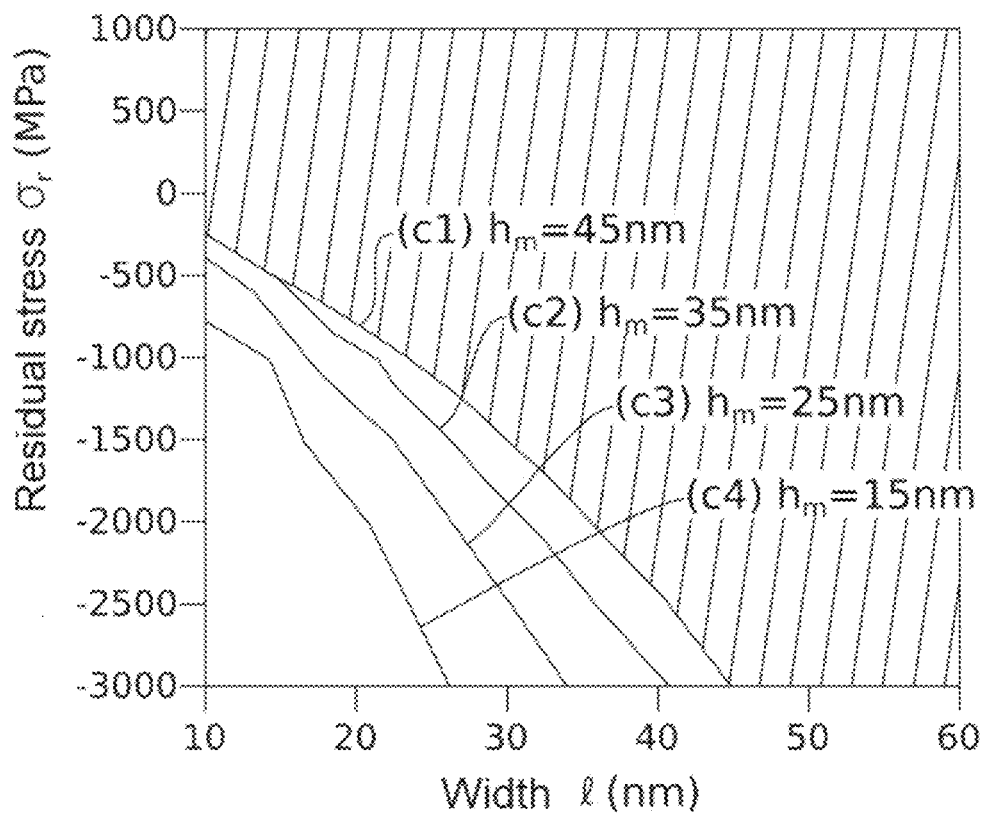
FIG. 5 is a graphic showing parametric zones favorable to the generation of random oscillations after etching of the trenches, according to an embodiment of the present invention.

FIG. 5 contains curves c1, c2, c3, and c4 defining regions where the undulation phenomenon occurs in the line patterns 310 when the trenches 210 are etched. These curves determine in part which residual stress $\sigma_r$ values are necessary for a given width l of the line patterns 310 and for a given thickness $h_m$ of metal mask 300. The curves c1, c2, c3, and c4 of FIG. 5 have been simulated for a height of wall 211 of $h_d$=180 nm. These curves c1, c2, c3, and c4 form a nomogram to which a person skilled in the art can refer to intentionally generate undulations when etching the trenches 210.

Thus, for a height of wall 211 of $h_d$=180 nm, the pairs of values ($\sigma_r$; l) located beneath each curve c1, c2, c3, and c4 give rise to the occurrence of undulations when etching the trenches 210. Curve c1 corresponds to a thickness of mask 300 of $h_m$=45 nm. Curve c2 corresponds to a thickness of mask 300 of $h_m$=35 nm.

Curve c3 corresponds to a thickness of mask 300 of $h_m$=25 nm.

Curve c4 corresponds to a thickness of mask 300 of $h_m$=15 nm.

Note that for a given height of wall 211, typically $h_d$=180 nm in the present case, the greater the width l of the line patterns 310 to be etched, the greater the thickness $h_m$ of mask 300 must be (for a constant residual stress $\sigma_r$) to generate oscillations. For a constant thickness $h_m$ of mask 300, the greater the width l of the line patterns 310, the greater the residual stress $\sigma_r$ must be (in negative values) to generate oscillations.

Furthermore, according to another nomogram of curves not shown, it must be noted that for a constant thickness $h_m$ of mask 300, the greater the width l of the line patterns 310, the greater the height $h_d$ of wall 211 must be to generate oscillations.

The parameters $\sigma_r$, l, $h_m$, and $h_d$ can be chosen, for example, as a function of the curves shown in FIG. 5, in the form of a measured or simulated nomogram. Such a nomogram can be easily made by a person skilled in the art according to the desired wall height. This makes it possible to know whether the oscillations are actually generated or not as a function of the values of the other parameters. It is possible to obtain similar nomograms by setting another of the parameters, for example for a given mask thickness or for a given line width. In this way, for example, it is possible to evaluate the parametric range for obtaining oscillations for different wall heights.

The parameters can be chosen so as to obtain sufficient undulation amplitudes to allow for a poor connection of certain via holes to the electrical tracks created from said undulations. For instance, a sufficiently high residual stress $\sigma_r$ can be chosen to enable a deformation of the line patterns. According to one possibility, the critical dimension $CD_{via}$ of the via holes (typically the diameter) is less than the width l of the line patterns 310. This increases the probability of having a via hole not superimposed over the electrical track associated with it in the layout.

Figure 6:
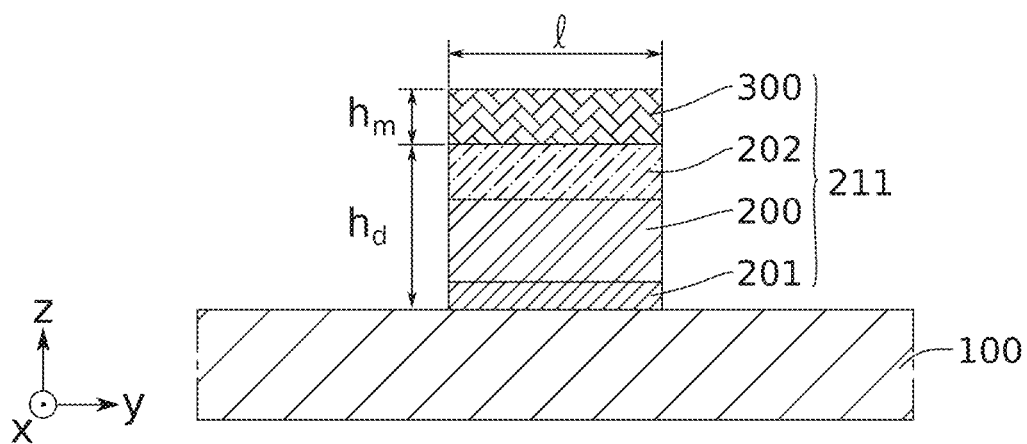
FIG. 6 shows a schematic cross-section of a wall comprising a stack of dielectric layers over which is located a metal mask line pattern, according to an embodiment of the present invention.

FIG. 6 shows an example of wall 211 with, above it, a line pattern 310 that gives rise to such undulations when the trenches 210 are etched. The wall 211 typically comprises an etch stop layer 201 made of SiCN with a thickness of 20 nm, a dielectric layer 200 made of p-SiOCH with a thickness of 120 nm, and a dielectric layer 202 made of SiO2 with a thickness of 40 nm. The wall 211 thus has a height $h_d$=180 nm. This wall 211 has, above it, a line pattern 310 made of TiN with a thickness $h_m$=35 nm. The wall 211 and the line pattern 310 typically have a width l≤50 nm.

The invention is typically implemented to make an individualization zone 1 (PUF zone) in an integrated circuit further comprising a functional zone 2 (non-PUF zone). In this case, the method for making the individualization zone is only implemented on a portion of the integrated circuit.

FIGS. 7A to 7H show an example of the fabrication of PUF and non-PUF zones on the same integrated circuit.

Figure 7A:
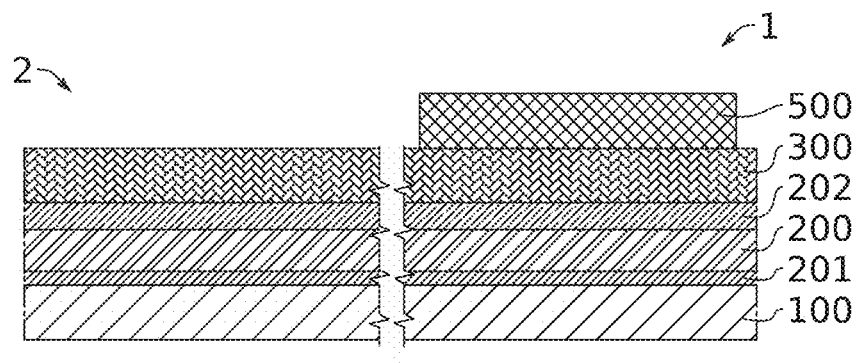
FIGS. 7A to 7F show steps in the manufacturing of an integrated circuit comprising at least one functional zone and one individualization zone, according to an embodiment example of the present invention.

As shown in FIG. 7A, the same stack comprising the at least one dielectric layer 200, 201, 202 and the metal mask 300 is formed in PUF 1 and non-PUF 2 zones. At this point, the metal mask 300 has the same thickness $h_m$ in each of the PUF 1 and non-PUF 2 zones. In order to modulate this thickness $h_m$ as a function of the PUF 1 and non-PUF 2 zones, a protective mask 500 is first deposited in the PUF 1 zone. This protective mask 500 can be based on resin, similarly to the mask 400 based on resin used for the lithography structuring of the metal mask 300.

Figure 7B:
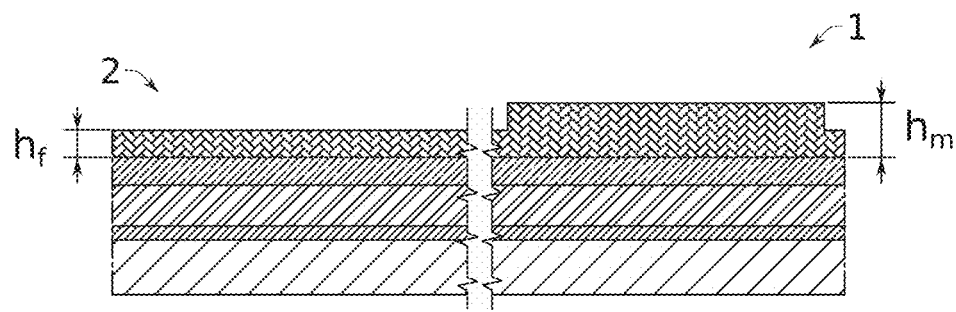

The thickness $h_f$ of metal mask 300 is reduced in the non-PUF zone 2, while the PUF 1 zone remains protected (FIG. 7B). This reduced thickness can be achieved by a full-plate etching step known by the name "etch-back."

Figure 7C:
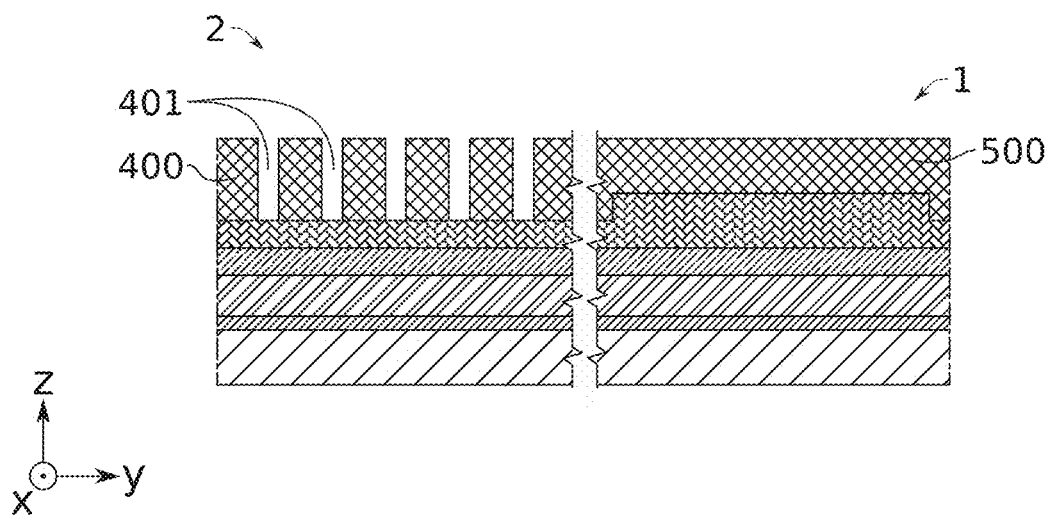

After the thickness $h_r$ of metal mask 300 has been reduced in the non-PUF zone 2, the conventional "damascene" method of lithography/etching can be implemented in the non-PUF zone 2 while protecting the PUF 1 zone with a protective mask 500 (FIG. 7C).

Figure 7D:
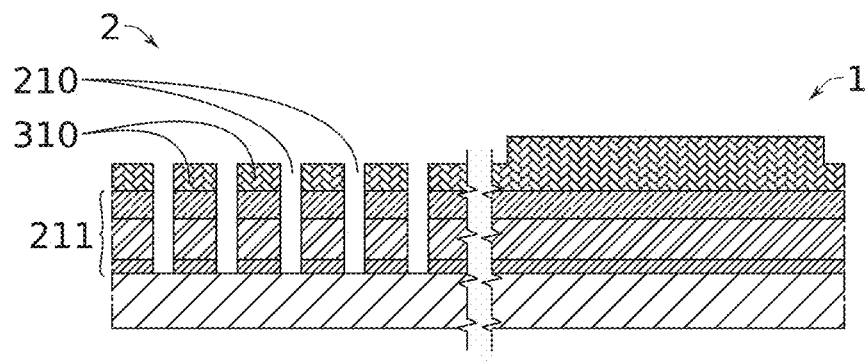
Figure 7E:
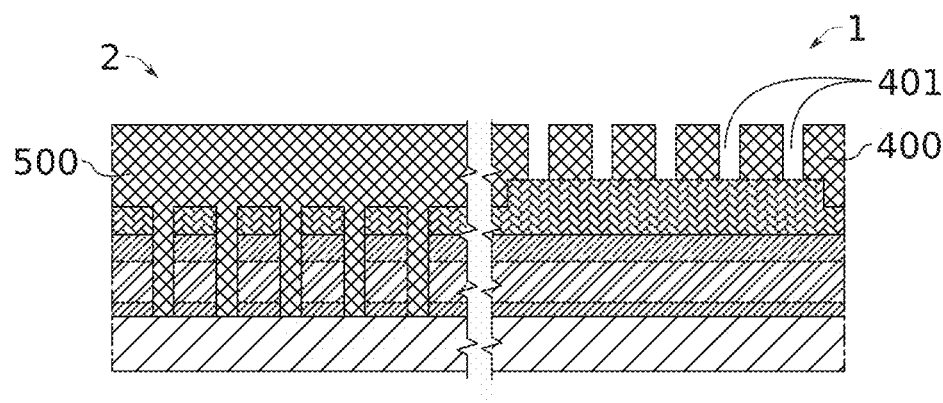
Figure 7F:
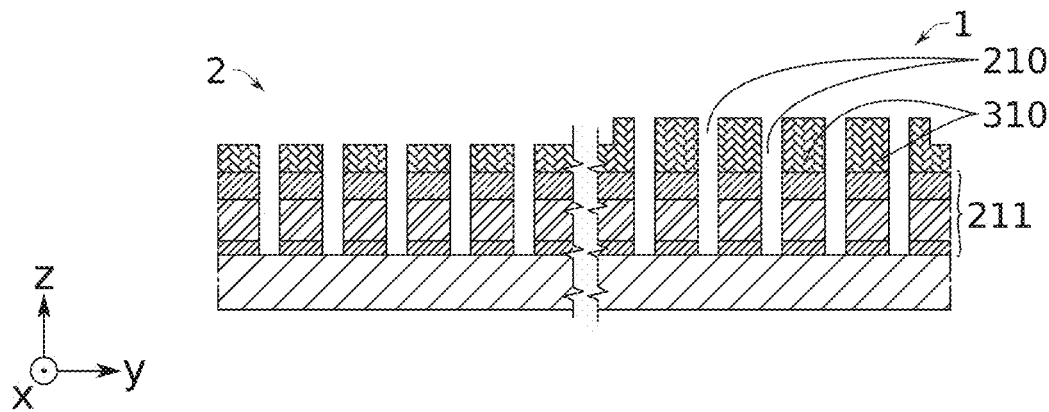

Trenches 210 are thus made in the stack of the non-PUF zone 2 (FIG. 7D). The walls 211 with the line patterns 310 formed in this non-PUF zone 2 do not have oscillations. This makes it possible to form a level of functional metal tracks. The protective mask 500 is then removed from the PUF 1 zone so that the modified "damascene" lithography/etching method described earlier can be implemented in the PUF 1 zone. Trenches 210 are thus made in the stack of the PUF 1 zone, while the non-PUF 2 zone is protected by a protective mask 500 (FIG. 7E). After etching of the trenches 210, the walls 211 with, above them, line patterns 310 formed in this PUF 1 zone, have oscillations (FIG. 7F). This makes it possible to form a level of dysfunctional metal tracks having width and/or position variations and/or undulations.

Figure 8:
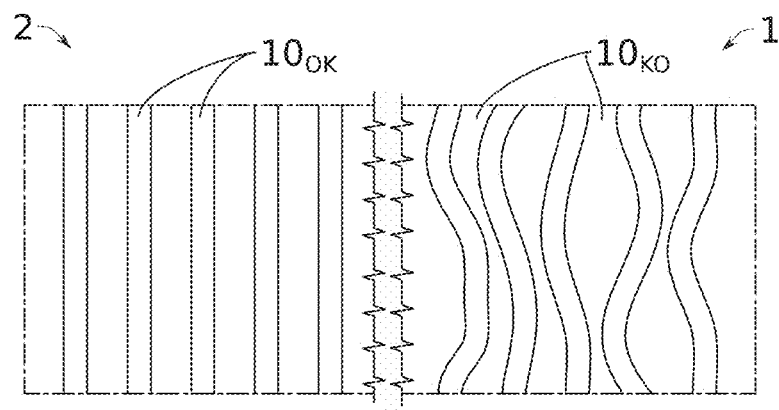
FIG. 8 shows a top view of the electrical tracks of the first level formed in the functional and individualization zones of an integrated circuit, according to an embodiment of the present invention.

FIG. 8 shows a top-view schematic of the electrical tracks formed in zones PUF 1 and non-PUF 2 after filling of the trenches and planarization. The electrical tracks $10_{OK}$ of the first level of the non-PUF zone 2 are typically straight, whereas the electrical tracks $10_{KO}$ of the first level of the PUF 1 zone have random width undulations/variations.

Figure 9:
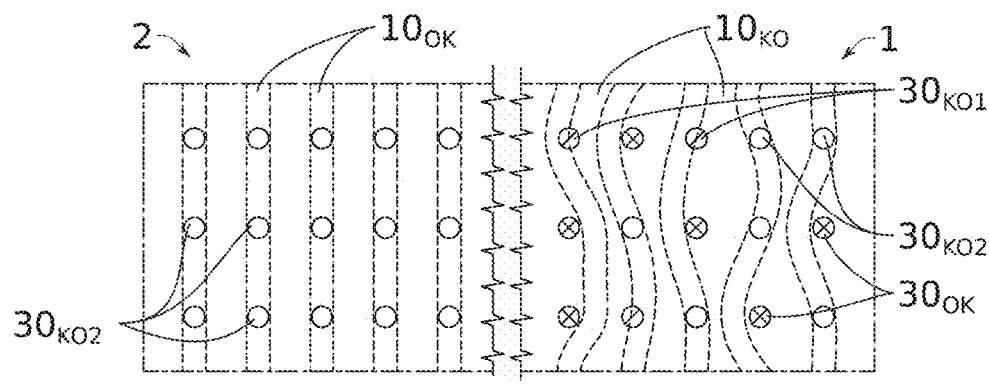
FIG. 9 shows a top view of the electrical tracks of the first level associated with functional via holes formed in a functional zone of an integrated circuit, and electrical tracks of the first level having random oscillations, associated with functional via holes and dysfunctional or inactive via holes formed in an individualization zone of the integrated circuit, according to an embodiment example of the present invention.

Thus, when the via holes are formed according to the initial layout of the integrated circuit, the via holes of the non-PUF zone 2 are functional via holes $30_{OK}$, and the via holes of the PUF zone 1 comprise dysfunctional or inactive via holes $30_{KO1}$, $30_{KO2}$ (FIG. 9). The via holes are typically formed simultaneously in the PUF 1 and non-PUF 2 zones.

Figure 10:
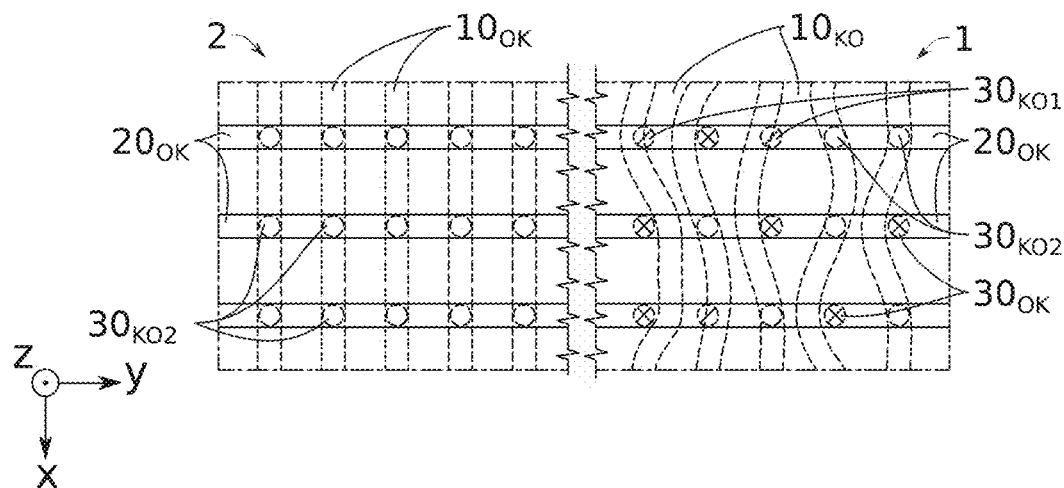
FIG. 10 shows a top view of the electrical tracks of the second level associated with functional via holes formed in a functional zone of an integrated circuit, and electrical tracks of the second level associated with functional via holes and dysfunctional or inactive via holes formed in an individualization zone of the integrated circuit, according to an embodiment example of the present invention.

FIG. 10 shows a top view schematic of the electrical tracks $20_{OK}$ of the second level formed in the PUF 1 and non-PUF 2 zones. The electrical tracks $20_{OK}$ of the second level are typically formed simultaneously in the PUF 1 and non-PUF 2 zones according to the initial layout of the integrated circuit.

In light of the foregoing description, it is clear that the proposed method offers a particularly effective solution for making a PUF individualization zone.

The invention is not limited to the embodiments described above and indeed extends to all the embodiments covered by the claims.

The embodiment described above is integrated into the manufacture of semiconducting compounds on the so-called "copper" back end. Nevertheless, the invention extends to embodiments using a conductive material other than copper. To that end, a person skilled in the art will know how to easily make the necessary adaptations in terms of the choice of materials and method steps.

Other embodiments of the method are obviously possible. For instance, the method can be implemented to generate oscillations in the first level 10A of electrical tracks and/or in the second level 20A of electrical tracks in an individualization zone. This further increases the probability that certain via holes of the conductor layer of an individualization zone will be poorly connected to the electrical tracks of one and/or the other of the first and second levels.

In addition, in the embodiments described in reference to the figures, the first level, the one in which the tracks are a function of the oscillations, is formed before the second level of electrical tracks. However, the invention covers those cases in which the first level, the one in which the tracks are a function of the oscillations, is formed after the second level of electrical tracks.

Furthermore, it is possible for the line patterns of the first and second levels not to be straight, as shown in FIGS. 8 to 10, but instead curved.

The invention claimed is:

1. A method for making an individualization zone of a microelectronic chip, said chip comprising a first and a second level of electrical tracks, a level of interconnections located between the first and the second levels of electrical tracks and comprising vias to electrically connect electrical tracks of the first level to electrical tracks of the second level, the method comprising, in the individualization zone of the chip:
providing a stack comprising at least one dielectric layer borne by a substrate with a metal mask layer above the stack, the at least one dielectric layer having a thickness $h_d$ and the metal mask layer having a thickness $h_m$ and a residual stress $\sigma r$,
etching the metal mask layer so as to form line patterns of width l organized according to a predefined arrangement plan, said line patterns to be transferred to the at least one dielectric layer,
etching the at least one dielectric layer between the line patterns so as to form trenches separated by walls based on the at least one dielectric layer,
filling the trenches with an electrically conductive material so as to form the electrical tracks of the first level,
forming vias of the conductor layer according to the predefined arrangement plan, and
forming the second level of electrical tracks,
wherein the thicknesses $h_d$ and $h_m$, the residual stress $\sigma_r$, and the width l are chosen so that the line patterns and the underlying walls have random oscillations after etching of the at least one dielectric layer the filling of the trenches being performed so that the electrical tracks of the first level are a function of these random oscillations, and the random oscillations being such that at least some of the vias are not connected to the electrical tracks of the first level.

2. The method according to claim 1, wherein the thickness $h_m$ of the metal mask layer is greater than 15 nm.

3. The method according to claim 1, wherein the thickness $h_d$ of the at least one dielectric layer is greater than 100 nm.

4. The method according to claim 1, wherein the metal mask layer is made of or based on one of Ti, TiN, and TaN.

5. The method according to claim 1, wherein the at least one dielectric layer comprises a layer based on dense SiOCH or porous SiOCH (p-SiOCH), or based on $SiO_2$.

6. The method according to claim 1, wherein the second level of electrical tracks is formed in such a way that the electrical tracks of the second level have random oscillations.

7. The method according to claim 1, wherein the chip has at least one other zone, separate from the individualization zone to form a functional zone of the chip, said method further comprising:
forming a protective mask in the individualization zone on the metal mask layer prior to said formation of the line patterns,
etching the metal mask layer in the functional zone, outside the individualization zone, so that the metal mask layer in the functional zone has a thickness $h_f < h_m$, and
removing the protective mask before formation of the line patterns in the individualization zone.

8. The method according to claim 7, wherein the line patterns are formed successively in the functional zone and in the individualization zone.

9. A method for making a microelectronic device including at least one integrated circuit, the integrated circuit comprising:
a first and a second level of electrical tracks,
a conductor layer located between the first and the second levels of electrical tracks and comprising via holes to electrically connect tracks of the first level to tracks of the second level, and
an individualization zone made by implementing the method according to claim 1 on only a portion of the integrated circuit.

10. A microelectronic device comprising at least one integrated circuit, the integrated circuit comprising at least one individualization zone and one functional zone, the individualization zone and the functional zone, the device comprising:
- a first and a second level of electrical tracks, and
- a level of interconnections located between the first and the second levels of electrical tracks and comprising vias to electrically connect tracks of the first level to tracks of the second level,
- wherein the electrical tracks of the first level of the individualization zone are separated by walls based on at least one dielectric layer, the walls have random oscillations such that at least some of the vias are not connected to the electrical tracks of the first level, and said walls pass through the individualization zone from side to side.

* * * * *